United States Patent [19]

Hutchens et al.

[11] Patent Number: 4,846,213

[45] Date of Patent: Jul. 11, 1989

[54] DRAIN THROUGH BALL VALVE

[75] Inventors: Wilbur D. Hutchens, Marshalltown; Robert F. Berry, Conrad; Kurt J. Leger, Marshalltown, all of Iowa

[73] Assignee: Fisher Controls International, Inc., Clayton, Mo.

[21] Appl. No.: 228,385

[22] Filed: Aug. 4, 1988

[51] Int. Cl.⁴ .................................................. F16K 5/06
[52] U.S. Cl. ................................. 137/241; 137/625.32; 251/209; 251/312; 251/315
[58] Field of Search ............... 137/238, 241, 625.32; 251/209, 304, 309, 312, 315

[56] References Cited

U.S. PATENT DOCUMENTS

| | | | |
|---|---|---|---|
| 2,510,514 | 6/1950 | Mueller | 251/103 |
| 2,712,454 | 7/1955 | Love | 251/309 X |
| 3,052,445 | 9/1962 | Kessler | 251/309 |
| 3,275,025 | 9/1966 | Kowalski | 137/330 |
| 3,354,904 | 11/1967 | Federle et al. | 251/209 X |
| 3,403,887 | 10/1968 | Myers | 251/209 |
| 3,536,296 | 10/1970 | Burris | 251/208 |
| 3,773,291 | 11/1973 | Grauer | 251/315 |
| 3,779,511 | 12/1973 | Wenglar | 251/306 |
| 3,883,113 | 5/1975 | Kolb | 251/209 |
| 4,103,868 | 8/1978 | Thompson | 251/283 |
| 4,140,149 | 2/1979 | Laignel et al. | 137/329.01 |
| 4,342,444 | 8/1982 | Sonderman | 251/315 |
| 4,465,259 | 8/1984 | Allen et al. | 251/304 |
| 4,696,323 | 9/1987 | Iff | 137/375 |

FOREIGN PATENT DOCUMENTS 1919865 10/1969 Fed. Rep. of Germany ...... 251/315

Primary Examiner—Gerald A. Michalsky
Attorney, Agent, or Firm—Marshall, O'Toole, Gerstein, Murray & Bicknell

[57] ABSTRACT

A fluid control valve with a rotatable shaft and a ball valve mounted within a flow bore. The ball has one or more V-shaped grooves for controlling fluid flow. In the closed position the ball and walls of the flow bore are in a continuous line sealing contact. The valve may be mounted and opened to enable complete drainage of fluid in the connecting pipeline which is an advantage in sanitary applications. The ball and shaft are part of a removable bonnet assembly with the ball inserted into the flow bore through an aperture in the valve body. A one-piece seal in the aperture provides a static seal between the valve body and bonnet and a dynamic shaft seal.

15 Claims, 2 Drawing Sheets

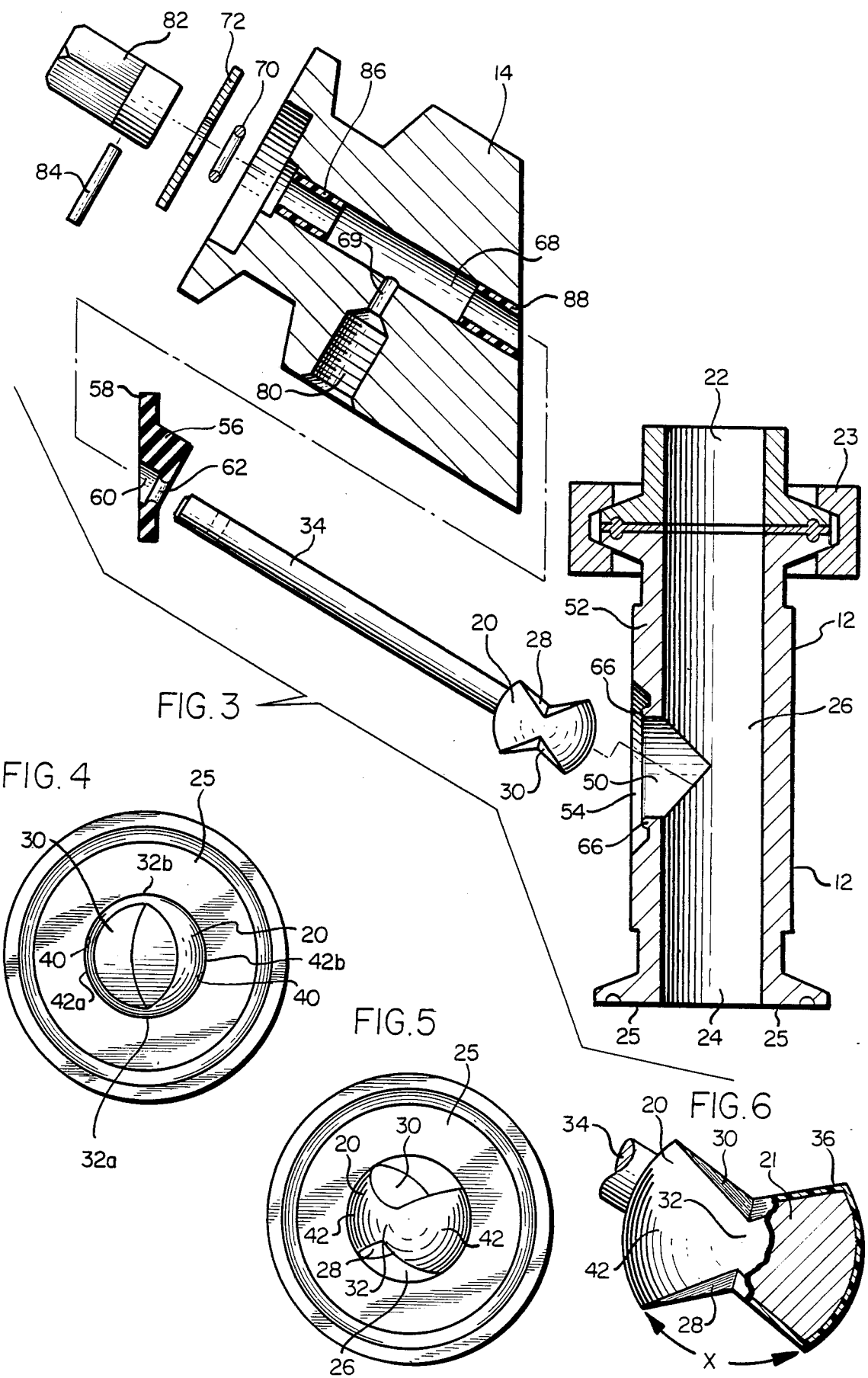

DRAIN THROUGH BALL VALVE

This invention relates to fluid valves and in particular to such valves having particular adaptability in the control of fluids in the production of pharmaceuticals and specialty chemicals, and in sanitary applications requiring precision flow control, or on-off applications.

BACKGROUND OF THE INVENTION

Reference may be made to the following U.S. Pat. Nos. of interest: 2,510,514; 2,712,454; 3,275,025; 3,403,887; 3,536,296; 3,773,291; 3,779,511 and 3,883,113; 4,103,868; 4,140,149, 4,342,444; 4,465,259; 4,696,323.

Control valves for the control of fluids in the production of pharmaceuticals, specialty chemicals, and sanitary applications require precision flow control, reliable sterilization, easy cleaning of parts in contact with the fluid, as well as the usual desired valve characteristics of ease of maintenance and being economical to manufacture. While some of the above mentioned patents may meet one or more of the desired characteristics for such a fluid control valve, none meets all of them.

Accordingly, it is desired to provide a fluid control valve having precision flow control, easy sterilization, cleanability and maintenance, and which also is reliable in operation and economical to manufacture.

SUMMARY OF THE INVENTION

A fluid control valve is provided with a valve body having a passageway forming a flow bore and a ball rotatably mounted within the flow bore with the ball sealing in a continuous line sealing contact formed between the outside diameter of the ball and the inside diameter of the flow bore. An elastomer coating surrounds the ball so that the outside diameter of the elastomer coating is slightly larger than the flow bore to provide a movable interference fit during ball rotation and a tight shutoff between the flow bore and the ball when the valve is closed. One or two grooves, preferably angled in a V-shape, are provided on the outside diameter of the ball so that the fluid flow is controlled by the groove as the ball is rotated about the ball and shaft axis.

The ball enters the valve body through an aperture perpendicular to the flow bore and having the same diameter as the flow bore. The ball and shaft may be part of a bonnet assembly so that the ball can be inserted through the valve body aperture until engaging in full contact within the flow bore and with the bonnet resting securely on the valve body. A one-piece shaft bonnet seal provides a static seal between the valve body and bonnet and also provides a dynamic shaft seal.

When the valve is mounted with the shaft horizontal, one of the ball grooves forming a flow opening in the flow bore is positioned on the bottom of the valve. This allows the pipeline to drain completely when the valve is open. This eliminates any retaining pockets for the process fluid which could contaminate the controlled process. Furthermore, this structure permits all of the fluid contacting members in the valve to be cleaned and sterilized while in the pipeline.

Accordingly, the structure of this unique valve provides the following features: (1) enables a line sealing contact between the outside diameter of the ball and the inside diameter of the flow bore to be the seal for the valve, thus leading to precision control through the grooves in the ball; (2) enables the ball to serve as the thrust member for the forces generated by the flow media thereby eliminating several parts normally used for this function; (3) enables the pipeline fluids to completely drain through the valve with a minimum slope on a horizontal line thereby providing ease in cleanability and sterilization; (4) uses one seal that provides both the dynamic shaft seal and the static seal between the body and the bonnet thereby eliminating unnecessary parts; (5) enables the valve assembly to be free of process retaining pockets that could contaminate the controlled process thereby providing a sterile assembly; (6) enables the complete bonnet and ball shaft assembly to be removed from the valve body by removing only four cap screws and disengaging the ball through one aperture from the valve body; (7) enables the valve internal surfaces to be machined and polished using conventional machine tools. Thus, the valve in accordance with the principles of the present invention has primary use in the production of pharmaceuticals and specialty chemicals which are produced for instance using genetically altered bacteria and yeasts. Additional uses can be in any sanitary application requiring either precision flow control, or on-off applications.

BRIEF DESCRIPTION OF THE DRAWINGS

The features of this invention are set forth with particularity in the appended claims. The invention may be best understood by reference to the following description taken in conjunction with the accompanying drawings, in which like reference numerals identify like elements in the several figures and in which:

FIG. 3 is an exploded sectional view of the valve body, bonnet, and ball shaft assembly;

FIG. 4 is an enlarged front elevational view of the valve in the closed position;

FIG. 5 is an enlarged front elevational view with the ball rotated in the open position;

FIG. 6 is an enlarged view of the ball partly in section; and

DETAILED DESCRIPTION

Figure 1:
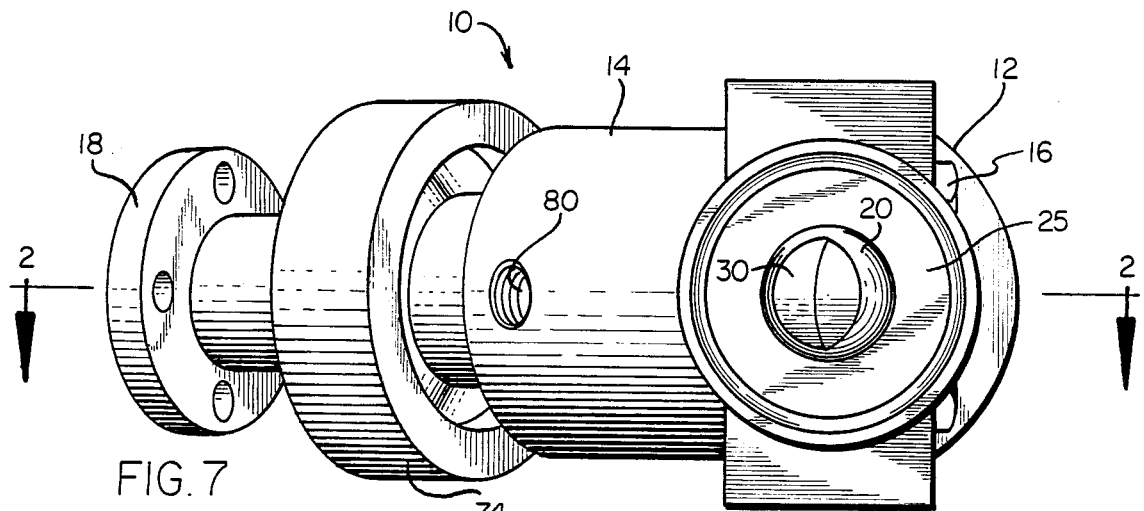
FIG. 1 is a front elevational view of a fluid control valve in accordance with this invention, with the valve actuator shaft in the horizontal position and the valve in a closed position.

Referring now to the drawings, FIG. 1 illustrates a fluid control valve 10 constructed in accordance with the principles of the present invention. Valve 10 includes a valve body 12 and a bonnet 14 attached by threaded cap screws 16 to the body 12. A yoke 18 is provided at the other end of bonnet 14 for coupling to a standard actuator for controlling the open/close position of the valve. In FIG. 1, a ball 20 is illustrated in the closed position within the flow bore of valve body 12.

Figure 2:
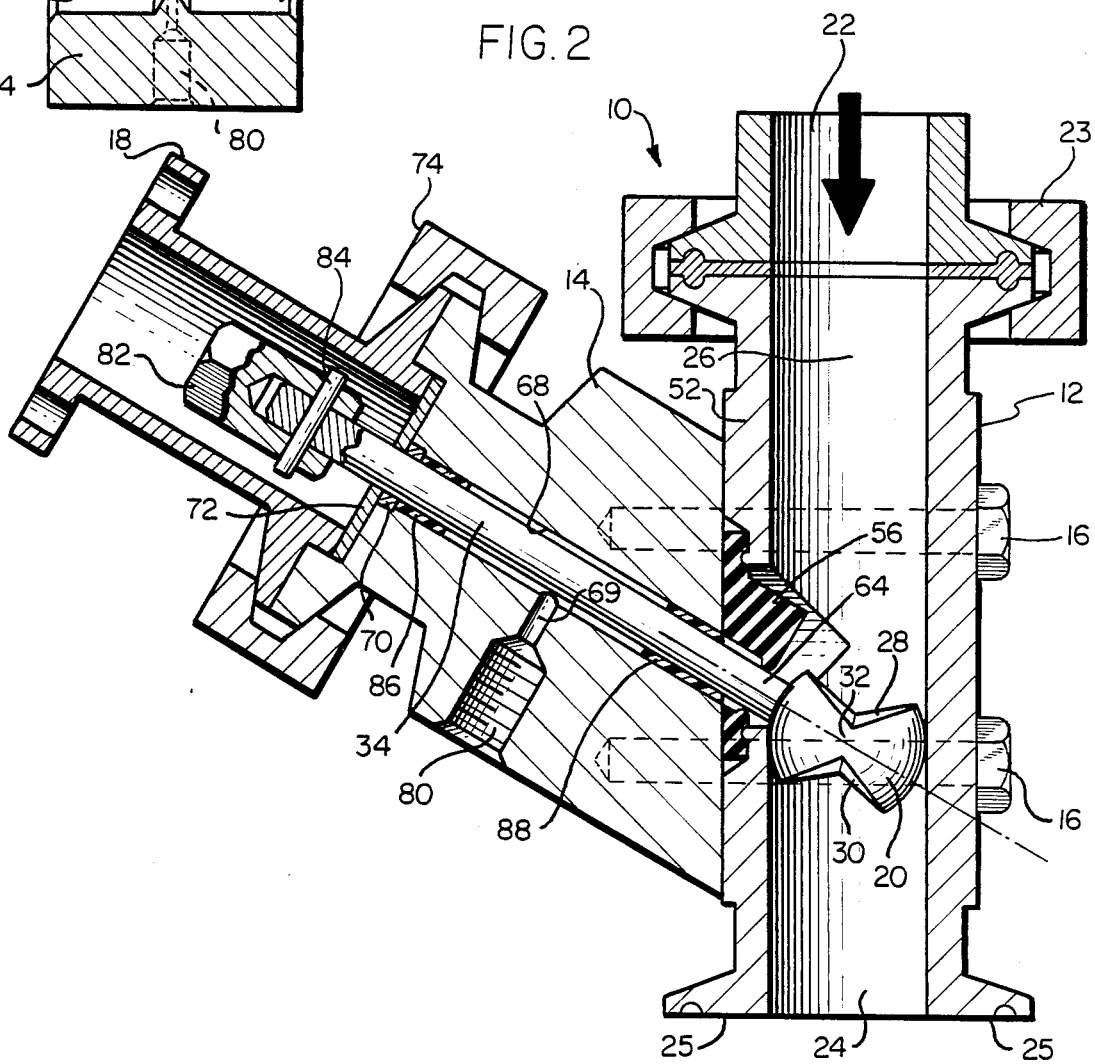
FIG. 2 is a cross-sectional view taken along section lines 2—2 of FIG. 1.

As seen most clearly in FIG. 2, valve body 12 includes inlet 22 and outlet 24 interconnected by flow bore 26. The arrow in FIG. 2 indicates the flow direction of fluid from inlet 22 to outlet 24, although it is understood that valve 10 can be operated as well with fluid flow in the opposite direction. A clamp 23 is provided at inlet 22 and a flange 25 at outlet 24. Ball 20 is spherical in shape and includes two grooves 28,30 each of which extends for less than 180° around the surface of ball 20 so as to leave a small area 32 of the ball surface therebetween on opposite ball sides (see FIGS. 2, 5, 6). Each groove is formed in a V-shape with an included angle X (FIG. 6) which preferably is between 90 and 120 degrees.

Fluid flow through valve 10 is controlled by grooves 28,30 as ball 20 is rotated in either direction about the axis of shaft 34. The size of the grooves can be varied to allow different valve capacities and only one groove may be utilized if desired. Significant advantages of the present invention are afforded when valve 10 is mounted in the pipeline so that shaft 34 is horizontal such as shown in FIG. 1. In this case, with the valve closed, ball 20 is in flow bore 26 in the position shown in FIG. 2 and in the front view of FIG. 4. However, when shaft 34 is rotated to place the ball in the full open position shown in FIG. 5, note that groove 28 is at the bottom of the valve and therefore at the lowest fluid flow point in flow bore 26 which allows the pipeline connected to valve 10 to drain completely when the valve is open. If two grooves 28,30 are used, then one or the other groove always will be at the bottom of the flow bore in the valve open position. If only one groove is used, then care must be taken to position the groove in the closed position so that when the ball is rotated to the valve open position the groove will be at the bottom of the flow bore.

Ball 20 includes an elastomer coating 36 completely covering the exposed exterior surfaces of ball 20, although if desired, elastomer coating 36 need only cover the spherical, non-grooved surfaces of ball 20. In either event, the diameter of spherical ball 20 and the thickness of the elastomer coating is sized so that the outside diameter of the elastomer coating is slightly larger than the diameter of flow bore 26 so as to provide a movable interference fit between ball 20 and the walls of flow bore 26 during ball rotation and a tight shutoff between the flow bore and the ball when the valve is closed. As shown in FIGS. 2 and 4, a fluid flow seal is provided in the valve by a line contact between the outside diameter of ball 20 and the inside diameter of flow bore 26. Line sealing contact 40 between ball 20 and flow bore 26 is formed by a continuous, unbroken seal line joining points 32a and opposite point 32b of narrow sections 32 between grooves 28 and 30 on the spherical surface of ball 20, and points 42a and opposite point 42b which are on respective opposite wide portions 42 on the spherical surface between grooves 28,30. Thus, from the closed position of the valve shown in FIG. 4 in which line contact seal 40 is formed between connected seal points 32a, 32b, 42a, 42b, shaft 34 can be rotated counterclockwise (from the driven shaft end) so that the ball 20 will assume the fully open position shown in FIG. 5.

Another significant advantage of the present invention can be seen from the sectional view of FIG. 2. Note that the line contact seal between ball 20 and flow bore 26 enables the ball to serve as the thrust member for the forces generated by the flow media. This unique structure eliminates the usual need for separate valve parts performing this function.

Mounting of ball 20 within the valve body provides another distinct advantage of the present valve and can be seen most readily from FIGS. 2 and 3. Valve body 12 includes an aperture 50 in wall 52 and in particular is formed with a groove 54 machined in wall 52. An elastomeric seal member 56 is adapted to fit in aperture 50 and includes flange 58 adapted to fit within groove 54, and aperture 60 having a diameter slightly larger than shaft 34. Aperture 60 also includes a smaller diameter portion forming an integral O-ring like seal 62. The diameter of seal portion 62 is slightly less than the diameter of shaft 34 so that there is a tight fit with the shaft to form a dynamic fluid shaft seal at shaft portion 64 (see FIG. 2).

Valve body groove 54 includes an annular shoulder 66 which depressingly engages into seal flange 58 when bonnet 14 is tightened onto valve body 12 by means of cap screws 16. Thus, seal 56 provides a dynamic shaft seal as well as a static seal between valve body 12 and bonnet 14.

Shaft 34 extends within bonnet passageway 68 and is sealed at its upper end by means of an O-ring 70 held in place by O-ring retainer 72. Standard clamp 74 retains yoke 18 on bonnet 14 with O-ring retainer 72 therebetween as shown in FIG. 2. Any fluid leaking out of flow bore 26 and into passageway 68 is of course sealed by O-ring 70.

Figure 7:
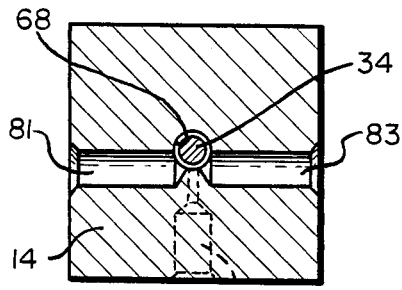
FIG. 7 is a sectional view of an alternative bonnet embodiment.

A standard leak-off connection 80 in bonnet 14 is normally sealed and may be opened to allow access to passageway 68 through connecting channel 69 in order to determine whether there is any undesired leaking of fluid past seal 56. When valve 10 is used in situations where sterility must be maintained, two purging connectors in bonnet 14, each like leak-off connection 80, can be provided. Steam can be supplied to one such purge connector and removed from the other purge connector to sterilize passageway 68 and thereby prevent contaminants from entering the process fluid through the area of seal 56. As an example, FIG. 7 illustrates a pair of purging connectors 81, 83 in bonnet 14, thereby enabling steam supplied to purge connector 81 to sterilize passageway 68 before exiting from purge connector 83.

At the top of shaft 34, a standard drive adapter 82 is mounted by a suitable pin 84 to shaft 34 to permit controlled driving actuation of shaft 34 and thereby controlling the position of ball 20. Shaft bearings 86,88, formed for example of Teflon, are suitably mounted in the bonnet at opposite ends of passageway 68 to support the movement of shaft 34.

To provide ease of assembling and removal of the parts for cleaning and maintenance, aperture 50 is substantially the same diameter as the flow bore and is perpendicular thereto, i.e. the central axis of aperture 50 is perpendicular to the longitudinal axis of flow bore 26. As noted in FIG. 3, ball 20 is inserted through aperture 50 to seat within the flow bore as shown in FIG. 2. Bonnet 14 is then attached to the valve body with screws 16. Removal of the ball valve is easily effected by removing screws 16 and moving bonnet 14 away from valve body 12.

In a constructed embodiment of the invention, elastomer 36 was molded in place around a metal ball 21 (FIG. 6) with a thickness of about 0.050 inch (1.27 mm). Ball 20 is sized with respect to flow bore 26 such that the outer diameter of elastomer 36 on metal ball 21 is 0.010 inch (0.254 mm) larger than the diameter of flow bore 26. Grooves 28,30 were each formed with an included angle of about 120 degrees.

Ball 20 also may be formed of a plastic or hard rubber interior with a softer, more resilient elastomer exterior. Alternatively, the entire ball may be formed of an elastomeric material.

Grooves 28,30 are formed on the ball surface to accommodate different desired valve flow capacities. As an example, larger flow capacities can be provided with each groove 28,30 being formed with an included angle of about 120 degrees. Smaller flow capacities can be provided with very shallow grooves each having an included angle of about 90 degrees.

Accordingly, the novel features of the valve 10 of the present invention are:

1. A line sealing contact between the outside diameter of the ball and the inside diameter of the flow bore is enabled to be the seal for the valve;

2. The ball serves as the thrust member for the forces generated by the flow media;

3. The pipeline fluids are allowed to completely drain through the valve with a minimum slope on a horizontal line;

4. A single seal provides both the dynamic shaft seal and the static seal between the body and bonnet;

5. The valve internal surfaces can be machined and polished using conventional machine tools;

6. The valve assembly is free of process retaining pockets that could contaminate the controlled process;

7. The complete bonnet, ball shaft assembly, yoke and drive actuator can be removed from the valve body by removing only four cap screws.

The foregoing detailed description has been given for clearness of understanding only, and no unnecessary limitations should be understood therefrom, as modifications will be obvious to those skilled in the art.

We claim:

1. A fluid control valve comprising:
   a valve body having an inlet at one end, an outlet at the other end, and a cylindrical flow bore extending between the inlet and outlet for communicating fluid through the valve body within the inner diameter defined between the walls of said cylindrical flow bore;
   a ball shaft assembly including a spherical shaped ball and a shaft for rotating the ball;
   said spherical shaped ball having a diameter substantially equal to the inner diameter of said cylindrical flow bore;
   said spherical shaped ball including a pair of symmetrical grooves on respective opposite outer surfaces of said ball;
   said grooves each extending less than 180° around the outer surfaces of said ball to define opposite symmetrical narrow spherical surfaces joined with opposite symmetrical wider spherical surfaces forming respective fluid sealing surfaces for blocking the flow of fluid;
   mounting means for mounting said ball shaft assembly to said valve body with said shaft angularly disposed with respect to said valve body and with said spherical shaped ball engaged in a movable interference fit within said valve body cylindrical flow bore, with said respective fluid sealing surfaces sealingly contacting the walls of said flow bore;
   said shaft being rotatable to rotate said spherical shaped ball from, (1) a first position blocking the passage of fluid through the valve wherein all of the fluid sealing surfaces on the ball narrow and wider spherical surfaces sealingly contact the walls of said flow bore in an unbroken seal line, to (2) a second position opening the passage of fluid through the valve wherein at least only the respective fluid sealing surfaces on the ball wider spherical surfaces sealingly contact the walls of said flow bore and fluid can flow only through each of said grooves.

2. A fluid control valve according to claim 1, wherein said spherical shaped ball includes an elastomer coating on said respective fluid sealing surfaces.

3. A fluid control valve according to claim 2, wherein said mounting means includes a bonnet having a passageway adapted for insertion of said shaft, and means for mounting said bonnet to said valve body.

4. A fluid control valve according to claim 3, including an aperture in the walls of said cylindrical flow bore in said valve body and wherein said mounting means includes a seal member sealingly engaged in said aperture for preventing the loss of fluid from the flow bore through said aperture.

5. A fluid control valve according to claim 4, said aperture including a seal groove formed in the cylindrical wall of said flow bore, and wherein said seal member includes a seal flange adapted to fit in the seal groove.

6. A fluid control valve according to claim 5, wherein said seal member includes a shaft passage to enable insertion of said shaft.

7. A fluid control valve according to claim 6, wherein said seal member shaft passage includes an inner seal portion with a diameter slightly smaller than the shaft diameter to form a fluid seal around the rotatable shaft.

8. A fluid control valve according to claim 3, including a pair of purging connectors each extending through said bonnet and communicating with said passageway and adapted for receiving a sterilizing medium for sterilizing said passageway from contaminants.

9. A fluid control valve according to claim 2, wherein said elastomer coating extends over the outer surfaces of said ball.

10. A fluid control valve according to claim 1, wherein said valve is aligned to enable the complete drainage of fluid through the valve body.

11. A fluid control valve according to claim 1, including an aperture in the walls of said cylindrical flow bore and said mounting means includes means for removably mounting said ball shaft assembly to said valve body by removably inserting said spherical shaped ball through said aperture.

12. A fluid control valve according to claim 11, wherein said aperture is circularly shaped and has a diameter substantially equal to the diameter of said spherically shaped ball.

13. A fluid control valve according to claim 1, wherein said grooves are each V-shaped and formed with an included angle of between 90 and 120 degrees.

14. A fluid control valve comprising:
   a valve body having an inlet at one end, an outlet at the other end, and a cylindrical flow bore extending between the inlet and outlet for communicating fluid through the valve body within the inner diameter defined between the walls of said cylindrical flow bore;
   a ball shaft assembly including a spherical shaped ball and a shaft for rotating the ball;
   said spherical shaped ball having a diameter substantially equal to the inner diameter of said cylindrical flow bore;
   said spherical shaped ball including at least one groove on the outer surface of said ball;
   said groove extending less than 180° around the outer surface of said ball to define respective fluid sealing surfaces for blocking the flow of fluid;
   mounting means for mounting said ball shaft assembly to said valve body with said shaft angularly disposed with respect to said valve body and with said spherical shaped ball engaged in a movable interference fit within said valve body cylindrical flow bore, with said respective fluid sealing surfaces sealingly contacting the walls of said flow bore;

said shaft being rotatable to rotate said spherical shaped ball from, (1) a first position blocking the passage of fluid through the valve wherein all of the fluid sealing surfaces on the ball sealingly contact the walls of said flow bore in a continuous, unbroken seal line, to (2) a second position opening the passage of fluid through the valve wherein only a portion of the respective fluid sealing surfaces sealingly contact the walls of said flow bore so that said seal line is non-continuous and fluid can flow only through said groove.

15. A fluid control valve according to claim 14, wherein said groove is V-shaped and formed with an included angle of between 90 and 120 degrees.

* * * * *